(12) United States Patent
Nakazawa

(10) Patent No.: US 11,374,913 B2
(45) Date of Patent: Jun. 28, 2022

(54) MANAGEMENT SYSTEM AND METHOD

(71) Applicant: CANON KABUSHIKI KAISHA, Tokyo (JP)

(72) Inventor: Toshiyuki Nakazawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 253 days.

(21) Appl. No.: 16/701,272

(22) Filed: Dec. 3, 2019

(65) Prior Publication Data
US 2020/0204532 A1    Jun. 25, 2020

(30) Foreign Application Priority Data

Dec. 19, 2018  (JP) .............................. JP2018-237783
Sep. 6, 2019   (JP) .............................. JP2019-162745

(51) Int. Cl.
*H04L 9/40* (2022.01)

(52) U.S. Cl.
CPC .................... *H04L 63/08* (2013.01)

(58) Field of Classification Search
CPC ........................ H04L 63/08; H04L 63/0807
USPC ........................................................ 726/6
See application file for complete search history.

(56) References Cited

U.S. PATENT DOCUMENTS

| | | | |
|---|---|---|---|
| 8,966,076 B2 | 2/2015 | Kawana | |
| 2009/0113035 A1 | 4/2009 | Ohashi | |
| 2014/0007185 A1* | 1/2014 | Han | G06F 21/32 726/1 |
| 2014/0139865 A1* | 5/2014 | Ishimura | H04L 41/0213 358/1.15 |
| 2015/0074796 A1* | 3/2015 | Meir | H04L 63/0861 726/19 |
| 2018/0152336 A1* | 5/2018 | Ando | H04L 29/06 |
| 2019/0007404 A1* | 1/2019 | Igari | G06F 21/608 |
| 2019/0199575 A1* | 6/2019 | Manabe | H04L 41/0213 |

FOREIGN PATENT DOCUMENTS

| | | |
|---|---|---|
| JP | 2009110261 A | 5/2009 |
| JP | 2013016143 A | 1/2013 |

* cited by examiner

*Primary Examiner* — Benjamin A Kaplan
(74) *Attorney, Agent, or Firm* — Rossi, Kimms & McDowell LLP

(57) ABSTRACT

If authentication information used for communication has not been determined in a case where authentication is required in communication with a network device, a communication unit of a management system attempts the authentication processing with the network device by using information for one piece each in order from among shared authentication information that has been managed. If the authentication has succeeded, a storage unit stores the authentication information used in the authentication in association with the network device. If the authentication information to be used for the communication has been stored in a case where the authentication is required in communication with the network device, the communication unit performs communication using the stored authentication information without performing an attempt.

10 Claims, 12 Drawing Sheets

FIG. 3A

SETTINGS OF SHARED AUTHENTICATION INFORMATION

AUTHENTICATION INFORMATION: SNMP v3 ▼ (301)  Read/Write ▼ (302)  + Add (303)

| AUTHENTICATION TYPE | ACCESS RIGHT | |
|---|---|---|
| SNMP v1 | READING | ✓ |
| SNMP v1 | READING/WRITING | ✓ |
| SNMP v3 | READING | ✓ |

SNMP v1 AUTHENTICATION SETTINGS

ACCESS RIGHT: READING

COMMUNITY NAME

```
public
banana
orange
```
306

307 — STORE    CANCEL — 308

FIG. 3C

SNMP v3 AUTHENTICATION SETTINGS

ACCESS RIGHT: READING/WRITING

+ Add — 309

| USER NAME | AUTHENTICATION KEY | | ENCRYPTING KEY | | CONTEXT | |
|---|---|---|---|---|---|---|
| admin | ●●●●● | SHA1 ▼ | ●●●●● | AES ▼ | vegs | ✓ |
| manager | ●●●●● | MD5 ▼ | ●●●●● | DES ▼ | fruits | ✓ |

310  311

STORE   CANCEL 312  313

FIG. 7A

SETTINGS FOR SHARED AUTHENTICATION INFORMATION

AUTHENTICATION INFORMATION: [DOMAIN AUTHENTICATION ▼] 301  [Read/Write ▼] 302  [+ Add] 303

| AUTHENTICATION TYPE | ACCESS RIGHT | |
|---|---|---|
| SNMP v1 | READING | ✓ |
| SNMP v1 | READING/WRITING | ✓ |
| SNMP v3 | READING | ✓ |
| SNMP v3 | READING/WRITING | ✓ |
| PIN | READING/WRITING | ✓ |
| PASSWORD | READING/WRITING | ✓ |
| USER AUTHENTICATION | READING | ✓ |

DOMAIN AUTHENTICATION AUTHENTICATION SETTING

ACCESS RIGHT: READING/WRITING

[+ Add] 701

| DOMAIN NAME | USER NAME | PASSWORD | |
|---|---|---|---|
| eagles | administrator | ●●●●●●● | ✓ |
| eagles | printer_manager | ●●●● | ✓ |

702  703

[STORE] 704  [CANCEL] 705

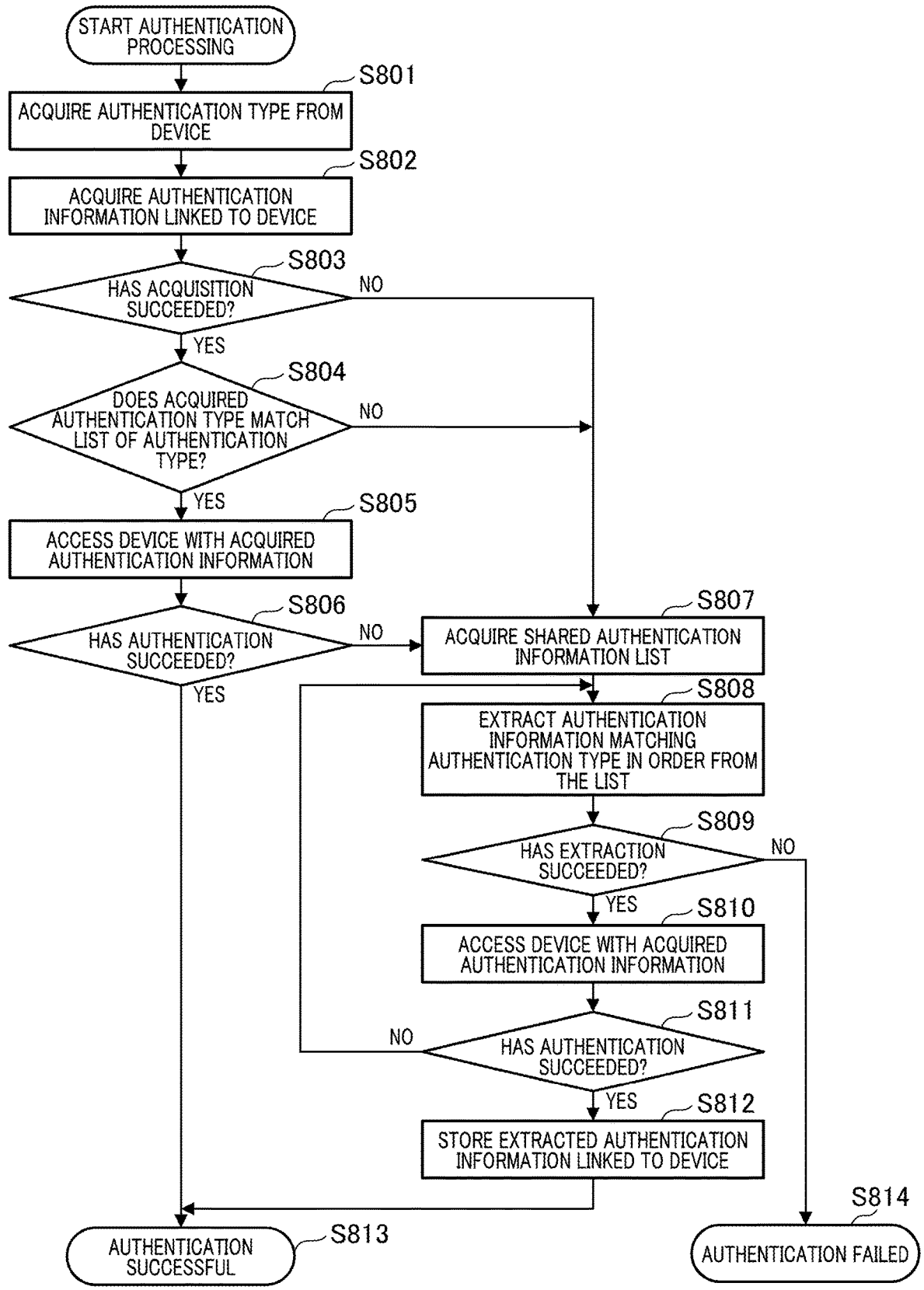

FIG. 11A

SETTINGS OF SHARED AUTHENTICATION INFORMATION

AUTHENTICATION INFORMATION: [SNMP v3 ▼] 301  [Read/Write ▼] 302  [+ Add] 303   1101

| AUTHENTICATION TYPE | ACCESS RIGHT | AGENT | |
|---|---|---|---|
| SNMP v1 | READING | [ALL AGENTS] | ✓ |
| SNMP v3 | READING/WRITING | Tokyo | ✓ |
| SNMP v3 | READING/WRITING | London, Cicago | ✓ |

SNMP v3 AUTHENTICATION SETTINGS

ACCESS RIGHT: READING/WRITING

[+ Add] — 309    310 — 311

| USER NAME | AUTHENTICATION KEY | | ENCRYPTING KEY | | CONTEXT | |
|---|---|---|---|---|---|---|
| admin | ●●●●●● | SHA1 ▼ | ●●●●● | AES ▼ | vegs | ✓ |
| manager | ●●●●●● | MD5 ▼ | ●●●●● | DES ▼ | fruits | ✓ |

1102 — ○ USE THIS AUTHENTICATION SETTINGS IN ALL AGENTS
1103 — ● USE THIS AUTHENTICATION SETTINGS IN SELECTED AGENTS

| | AGENT NAME |
|---|---|
| ☐ | 1105 |
| ☑ | Cicago — 1106 |
| ☑ | London — 1107 |
| ☐ | Tokyo — 1108 |

— 1104   [STORE] — 312   [CANCEL] — 313

MANAGEMENT SYSTEM AND METHOD

BACKGROUND OF THE INVENTION

Field of the Invention

The present invention relates to a management system and a method.

Description of the Related Art

A conventional management device that manages an image forming device such as a printer and a multifunction peripheral (hereinafter, also referred to as a "device") acquires information from the device and instructs the device to perform processing by using communication such as SNMP and HTTP. Note that SNMP is the abbreviation for Simple Network Management Protocol, and HTTP is the abbreviation for Hyper Text Transfer Protocol.

When connecting the management device to the device by using the communication, authentication information is required. For example, in an SNMP version 1 and an SNMP version 2, a community name that has been set in the device needs to match a community name to be set in a SNMP request transmitted by the management device. For example, if the management device is connected to the device by using HTTP, authentication information that matches the authentication information set in the device needs to be set in the HTTP header information and the like. Accordingly, the management device needs to manage the authentication information to be used in accessing the device for each device for each type of communication.

As a method for managing this authentication information, it has been proposed that an appropriate piece of authentication information is determined from among a plurality of candidates in accordance with a type of the device to be managed (see, for example, Japanese Unexamined Patent Application, First Publication No. 2009-110261). Alternatively, if the authentication information is managed for each function in a management application, using management information set by another function has also been proposed (see, for example, Japanese Unexamined Patent Application, First Publication No. 2013-16143).

In the device managed by the management device, various types of authentication are performed for each device in accordance with, for example, the type of the device, the configuration of the device, and the location of the device. Therefore, in operating the management device that manages a plurality of devices, it is very complicated for a user to set and manage the authentication information that differs for each device.

SUMMARY OF THE INVENTION

A management system according to an embodiment comprises: a management unit configured to manage information that is necessary for authentication, at least one piece of which is registered for each protocol, to serve as shared authentication information; a communication unit configured to attempt authentication processing with the network device by using the information for one piece each in order from among the managed shared authentication information if authentication information to be used for the communication has not been determined in a case where authentication is required in communication with a network device; and a storage unit configured to store the authentication information that has been used in the authentication in association with the network device if the authentication has succeeded. If the authentication information to be used for the communication has been stored in a case where authentication is required in communication with the network device, the communication unit performs communication using the stored authentication information without performing an attempt.

Further features of the present invention will become apparent from the following description of exemplary embodiments with reference to the attached drawings.

BRIEF DESCRIPTION OF THE DRAWINGS

FIG. 3A to FIG. 3C each illustrate a display example of a shared authentication information management screen and a shared authentication information editing screen.

FIG. 7A and FIG. 7B each illustrate a display example of the shared authentication information management screen and the shared authentication information editing screen.

FIG. 8 is a flowchart illustrating a process of confirming the authentication information.

FIG. 11A and FIG. 11B each illustrate a display example of the shared authentication information management screen and the shared authentication information editing screen according to the third embodiment.

DESCRIPTION OF THE EMBODIMENTS

Hereinafter, embodiments of the present invention will be described below with reference to the drawings and the like.

First Embodiment

Figure 1:
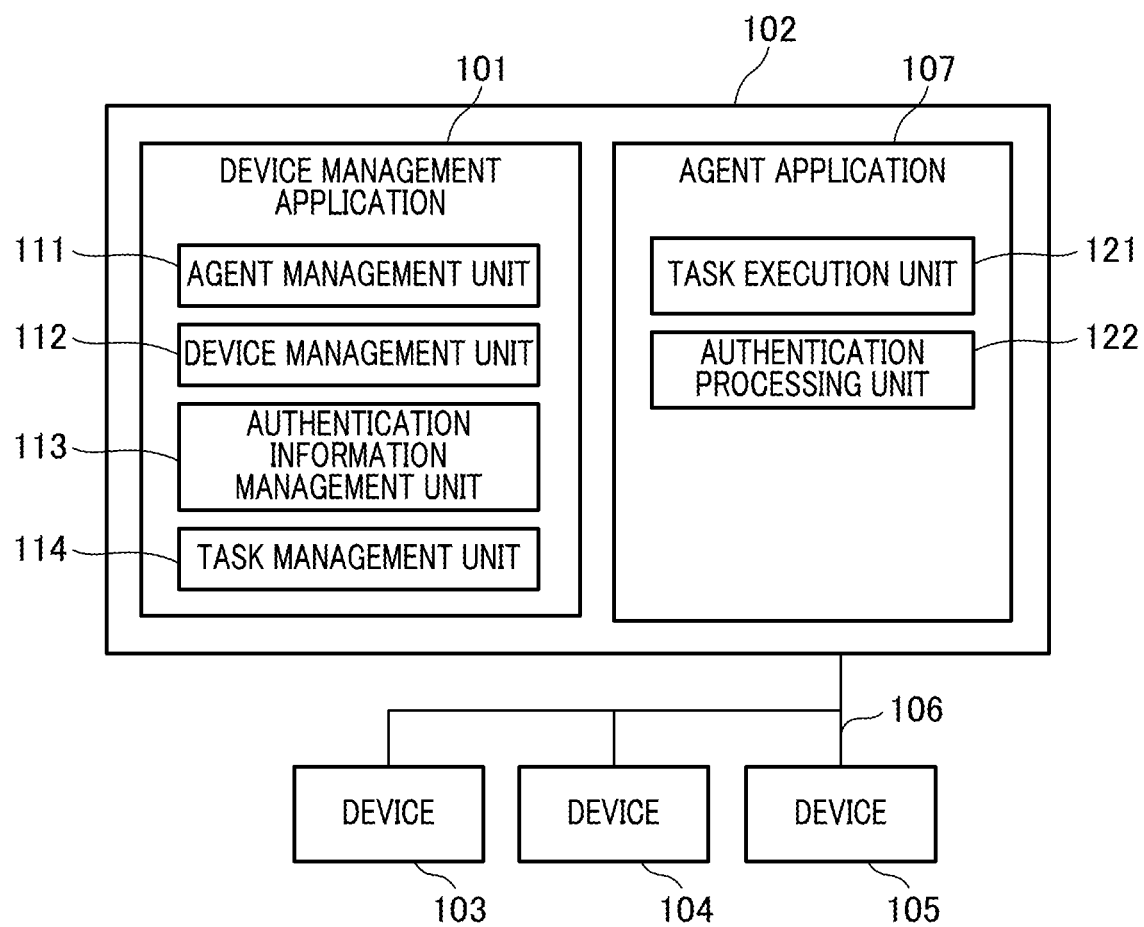
FIG. 1 is a block diagram illustrating the overall configuration of a management system of a network device and components of each application.

FIG. 1 illustrates an example of the overall configuration of a management system of a network device according to the first embodiment. In FIG. 1, a management device 102 and devices 103, 104, and 105 are each connected by a network 106.

The devices 103, 104, and 105 are network devices that are managed by a device management application 101, to be described below, of the management device 102. Examples of the devices 103, 104, and 105 include various peripheral devices that can be connected to a network, for example, an image forming device such as a printer or a multifunction peripheral, a network-connected projector, and a network camera. Note that the number of network devices connected to the management device 102 is not limited to the example shown in FIG. 1.

The management device 102 is an information processing device that manages the devices 103, 104, and 105. In the management device 102, the device management application 101 and an agent application 107 operate. The device management application 101 is an example of first software, and is software that manages the devices 103, 104, and 105. The agent application 107 is an example of second software, and is software that cooperates with the device management application 101 for managing the network device.

The device management application 101 has an agent management unit 111, a device management unit 112, an authentication information management unit 113, and a task management unit 114, which serve as software modules. The agent management unit 111 manages information about the agent application 107. Additionally, the agent management unit 111 manages the association (linking) between the identification information and the authentication information of the network device to be managed by the agent application 107.

The device management unit 112 manages information about the devices 103, 104, and 105, which are to be managed. The authentication information management unit 113 manages the authentication information used by the agent application 107. The authentication information managed by the authentication information management unit 113 is stored in a storage device such as a hard disk to be described below.

The task management unit 114 creates tasks that define processing contents such as the information acquisition and setting distribution for the devices 103, 104, and 105, and the execution timing, and manages these tasks. For example, the tasks include a task that acquires device configuration information, a task that searches a device, a task that distributes an address book, and a task that distributes device setting information.

The agent application 107 has a task execution unit 121 and an authentication processing unit 122 to serve as software modules. The task execution unit 121 communicates with the network device by using, for example, SNMP based on the task that has been created by the device management application 101. The task execution unit 121 acquires various types of information from the devices 103, 104, and 105 through the communication with the network device or changes setting values of the devices 103, 104, and 105. During communication with the devices 103, 104, and 105, the authentication processing unit 122 executes the authentication processing by using the authentication information managed by the device management application 101.

Figure 2:
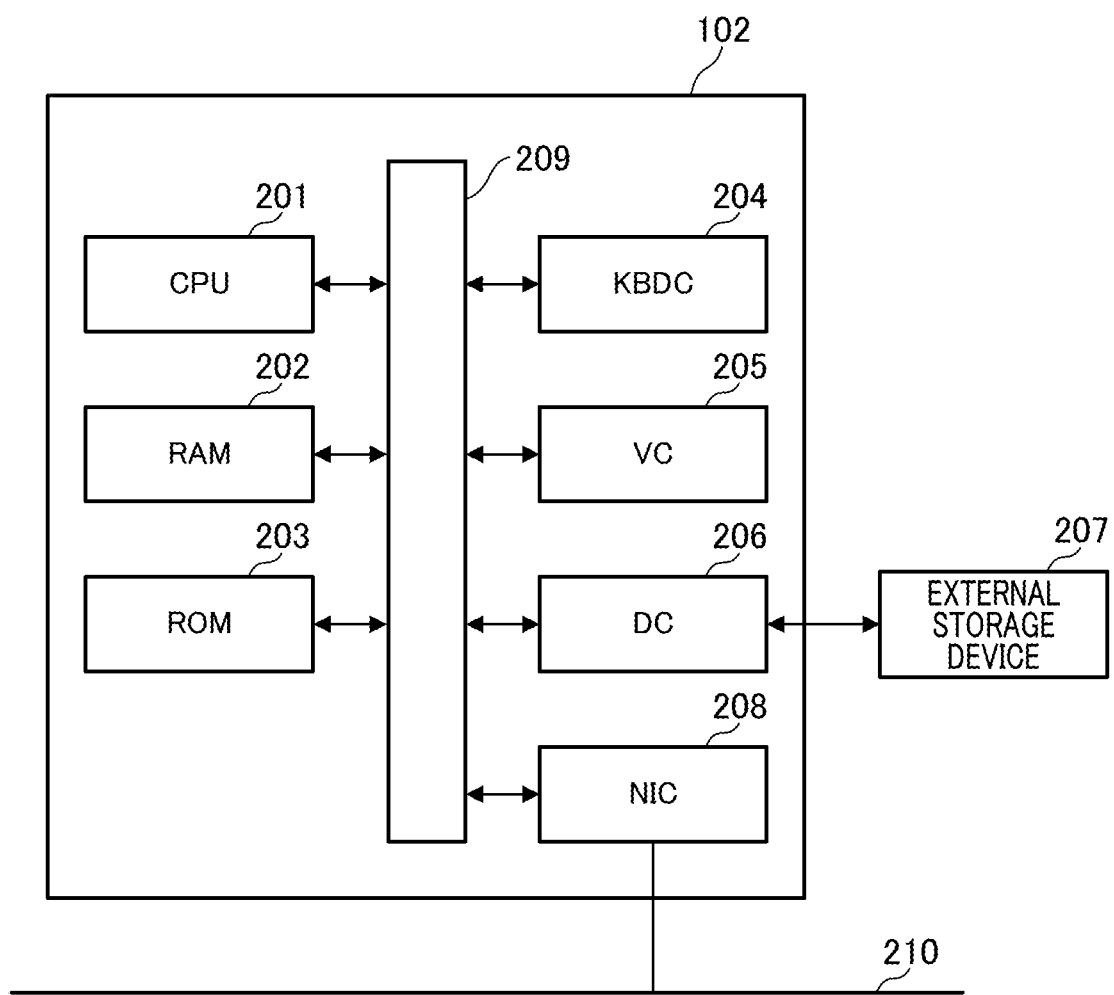
FIG. 2 is a block diagram illustrating an example of a hardware configuration of a management device.

FIG. 2 is a block diagram illustrating an example of the hardware configuration of the management device 102. As shown in FIG. 2, the information processing device that operates as the management device 102 includes a CPU 201, a RAM 202, a ROM 203, a KBDC 204, a VC 205, a DC 206, and a NIC 208. The CPU 201, the RAM 202, the ROM 203, the KBDC 204, the VC 205, the DC 206, and the NIC 208 are interconnected via a system bus 209. An external storage device 207 is connected to the management device 102. Additionally, the management device 102 is connected to a network 210. Note that the CPU is the abbreviation for Central Processing Unit, the RAM is the abbreviation for Random Access Memory, and the ROM is the abbreviation for Read Only Memory.

The CPU 201 loads software (a program) that has been stored in the ROM 203 and the external storage device 207 or downloaded from the network 210 into the RAM 202 as necessary, and executes it. Thus, the CPU 201 integrally controls each component connected to the system bus 209.

The RAM 202 functions as a main memory or a work area of the CPU 201. The ROM 203 is a nonvolatile storage medium that stores data, various programs, and various information tables.

The external storage device 207 is configured by a hard disk (HD), a solid state drive (SSD), and the like. The external storage device 207 stores various applications including a boot program, an operating system (OS), an authentication server, an authentication client, and stores database data, user files, and the like. The external storage device 207 also stores programs corresponding to each of the device management application 101 and the agent application 107. The CPU 201 loads these programs into the RAM 202 and executes the programs, thereby realizing the processing to be described below.

The KBDC 204 is a keyboard controller and transmits input information from an input device such as a keyboard and a pointing device (not illustrated) to the CPU 201. The VC 205 is a video controller and controls display of a display device configured by a liquid crystal display (LCD).

The DC 206 is a disk controller and controls access to the external storage device 207. The NIC 208 is a communication controller, and the information processing device is connected to the network 210 via the NIC 208.

Next, shared authentication information managed by the device management application 101 will be described. Table 1 schematically illustrates an example of the shared authentication information that has been managed. The authentication information is configured by information about an authentication type, information about an access right (authority), and authentication information, and at least one piece of the authentication information is registered for each protocol. As the information about the authentication type, information indicating the name of the authentication type (protocol) such as "SNMPv1" and "SNMPv3" is stored. As the information about the access right, information indicating the type of access such as "for reading (R)" and "for reading/writing (RW)" is stored. As the authentication information, authentication information specified by the authentication type described by a character string in JSON format is stored.

TABLE 1

| Authentication Type | Authority | Authentication Information |
|---|---|---|
| SNMPv1 | R | ["public", "banana", "orange"] |
| SNMPv1 | RW | ["secret", "cabbage", "carrot"] |
| SNMPv3 | R | [{"name":"admin", "authK":"apple", "authP":"sha1", "encK":"grape", "encP":"aes", "context":""}, {"name":"manager", "authK":"mango", "authP":"sha1", "encK":"melon", "encP":"aes", "context":"grade"}] |

TABLE 1-continued

| Authentication Type | Authority | Authentication Information |
|---|---|---|
| SNMPv3 | RW | [{"name":"admin", "authK":"cabbage", "authP":"sha1", "encK":"carrot", "encP":"aes", "context":"veget"}] |

Here, the data in the first row shown in Table 1 means that when the authentication type is "SNMPv1" and the access right is "for reading", the community names are "public", "banana", and "orange". The data in the second row shown in Table 1 means that when the authentication type is "SNMPv1" and the access right is "for reading/writing, the community names" are "secret", "cabbage", and "carrot".

Additionally, the data in the third row shown in Table 1 means that when the authentication type is "SNMPv3" and the access right is "for reading/writing", two types of names of "admin" and "manager" are set as the authentication information. The data in the fourth row shown in Table 1 stores the authentication information for writing of SNMPv3.

FIG. 3A illustrates a display example of the shared authentication information management screen. Here, the processing related to each screen shown in FIG. 3A to FIG. 3C is all executed by the authentication information management unit 113 of the device management application 101.

As shown in FIG. 3A, the authentication information management screen includes a table 304 that displays the list of the shared authentication information being currently set. The table 304 in FIG. 3A shows an example in which the shared authentication information for "reading of SNMPv1", "reading/writing of SNMPv1", and "reading of SNMPv3" is set. When a user's specifying operation of an icon 305 denoted by the symbol "√" at the right end of the table 304 is detected, the device management application 101 deletes the authentication information of the corresponding row from the shared authentication information shown in the table 1, and also deletes the display of the corresponding row from the table 304.

Additionally, when the user's specifying operation of the row in the table 304 is detected, the device management application 101 opens an editing screen for the shared authentication information corresponding to the clicked row. Additionally, when the pressing of an add button 303 included in the authentication information management screen is detected, the device management application 101 opens the editing screen for the shared authentication information selected by an authentication type selection drop-down 301 and an access right selection drop-down 302.

Note that the device management application 101 controls the drop-downs 301 and 302 so that only the authentication type and the access right that can be added can be selected on the authentication information management screen. For example, in the case of FIG. 3A, if SNMPv1 and SNMPv3 can be set to serve as the authentication type, only the shared authentication information for reading/writing of SNMPv3 can be added.

FIG. 3B illustrates a display example of the editing screen that edits the shared authentication information for reading of SNMPv1 displayed by the operation of FIG. 3A. As shown in FIG. 3B, the editing screen includes a text box 306 for inputting a community name, a storage button 307, and a cancel button 308. It is possible to input a plurality of rows in the text box 306, and a user can input a plurality of community names at one time in the text box 306. In the example of FIG. 3B, "public", "banana", and "orange" are input in the text box 306 to serve as the community names.

When the pressing of the storage button 307 has been detected, the device management application 101 stores the community name that has been input by the user in the text box 306 in the shared authentication information shown in Table 1 by associating the name with the authentication type (SNMPv1) and the access right. Subsequently, the device management application 101 closes the editing screen of FIG. 3B and returns the screen to the setting screen of the shared authentication information of FIG. 3A. Additionally, when the pressing of the cancel button 308 has been detected, the device management application 101 discards the edited contents, closes the editing screen of FIG. 3B, and returns the screen to the setting screen of the shared authentication information of FIG. 3A.

FIG. 3C illustrates a display example of the editing screen that edits the shared authentication information for reading/writing of SNMPv3, which is displayed by the operation of FIG. 3A. As shown in FIG. 3C, the editing screen includes an add button 309, a table 310, a storage button 312, and a cancel button 313.

The table 310 shows a list of the authentication information to be set. When the user's specifying operation of an icon 311 denoted by the symbol of "√" at the right end of the table 310 has been detected, the device management application 101 deletes the corresponding row from the table 310. When the pressing of the add button 309 has been detected, the device management application 101 adds a row at the end of the table 310.

When the pressing of the storage button 312 has been detected, the device management application 101 stores the contents of the table 310 set by the user in the shared authentication information shown in Table 1 in association with the authentication type (SNMPv3) and the access right. Subsequently, the device management application 101 closes the editing screen of FIG. 3C and returns the screen to the setting screen of the shared authentication information of FIG. 3A. Additionally, when the pressing of the cancel button 313 has been detected, the device management application 101 discards the edited contents, closes the editing screen of FIG. 3C, and returns the screen to the setting screen of the shared authentication information of FIG. 3A.

Next, the authentication information associated with the network device stored in the device management application 101 will be described. Table 2 schematically shows an example of the authentication information associated with network devices. Note that the meaning of the authentication type, the authority, and the authentication information in Table 2 are the same as those in Table 1, and therefore redundant description will be omitted.

TABLE 2

| Device ID | Authentication Type | Authority | Authentication Information |
|---|---|---|---|
| 4037e754 | SNMPv1 | R | "banana" |
| 4037e754 | SNMPv1 | RW | "tomato" |
| 8ff73899 | SNMPv1 | R | "carrot" |
| 8ff73899 | SNMPv1 | RW | "carrot" |
| d04973eb | SNMPv3 | R | [{"name":"admin", "authK":"cabbage", "authP":"sha1", "encK":"carrot", "encP":"aes", "context":"veget"}] |

The device ID in Table 2 is an identifier that uniquely identifies each of the devices 103, 104, and 105. Here, "4037e754", "8ff73899", and "d04973eb" respectively indicate the device IDs of the devices 103, 104, and 105. According to Table 2, the authentication information for accessing each network device is managed for each type of the authentication. For example, the data in the first row of Table 2 indicates that "banana" is used as a community name if information is read out from the device 103 by using SNMPv1.

Figure 4:
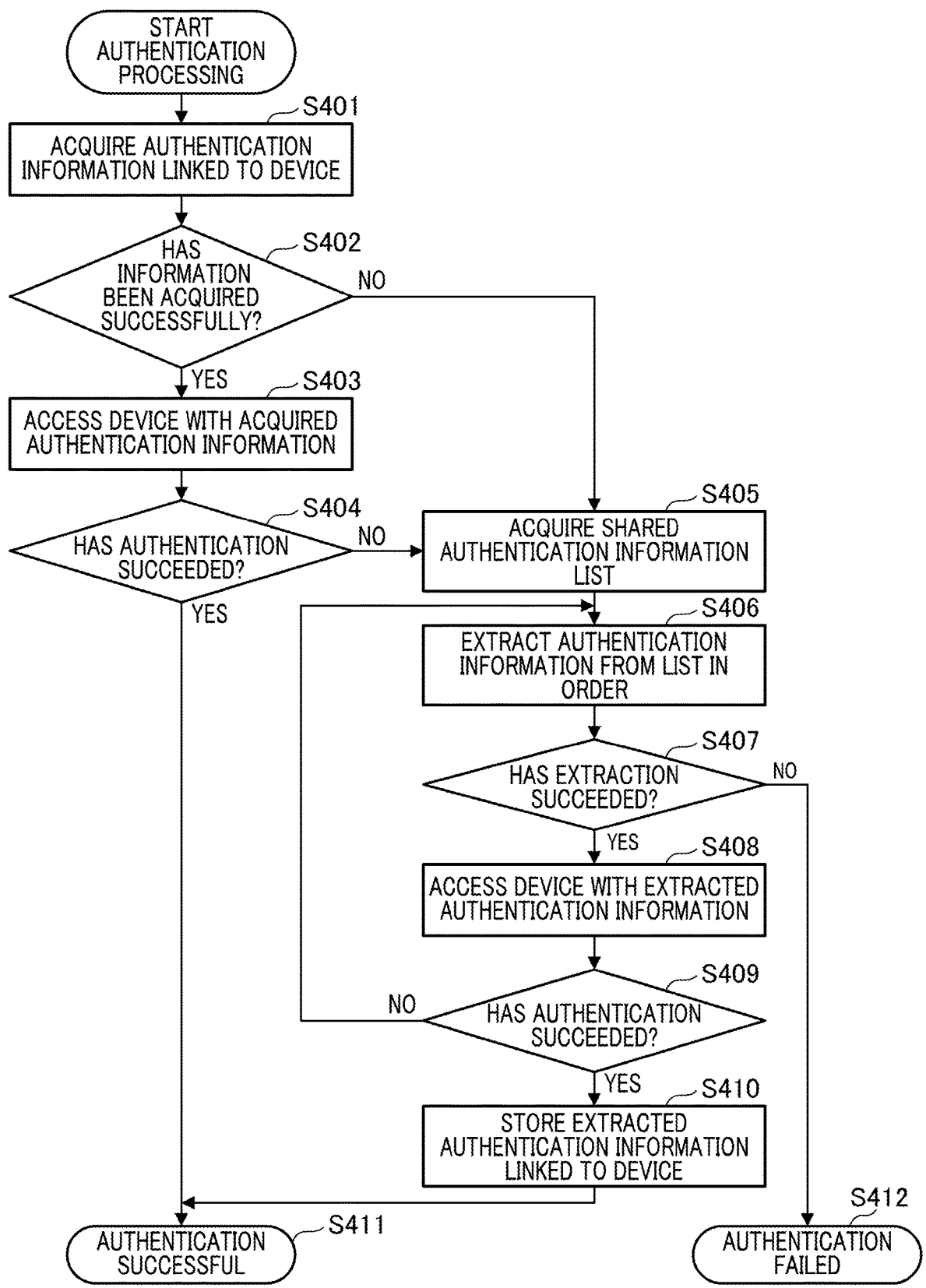
FIG. 4 is a flowchart illustrating a process of confirming the authentication information.

FIG. 4 is a flowchart illustrating a process in which the agent application 107 confirms the authentication information during communication with the device 103 by using a predetermined authentication type that requires the authentication. In the description below, an example in which the agent application 107 acquires information from the device 103 by using SNMPv1 will be described. The agent application 107 invokes this authentication processing together with information that uniquely identifies the device 103 (device ID) and information about the authentication type and the authority (for example, "reading" of "SNMPv1").

In step S401, the agent application 107 requests the device management application 101 to acquire the authentication information associated with the device 103.

At this time, the agent application 107 specifies the device ID of the device 103, the authentication type, and the authority, and performs the request. The authentication information management unit 113 of the device management application 101 refers to the authentication information (Table 2) associated with the network device and returns the authentication information corresponding to the request to the agent application 107. Note that if the authentication information corresponding to the request does not exist in Table 2, the authentication information management unit 113 returns a notification that there is no authentication information.

For example, if the device ID for the request indicates the device 103, in Table 2, the data of the first row exists to serve as the data showing that the device ID, the authentication type, and the authority match. In this case, the agent application 107 acquires "banana" to serve as the authentication information (community name). In contrast, if the device ID for the request indicates the device 105, in Table 2, the data showing that the device ID, authentication type, and authority match does not exist. In this case, the agent application 107 results in failing to acquire the authentication information.

In step S402, the agent application 107 checks the acquisition result of the authentication information to determine whether or not the authentication information has been acquired successfully. If the authentication information has been acquired successfully, the process proceeds to step S403, and if the acquisition of the authentication information has failed, the process proceeds to step S405.

If the authentication information has been acquired successfully, in step S403, the agent application 107 performs communication for accessing the device 103 by using the acquired authentication information. Subsequently, in step S404, the agent application 107 checks the result for accessing the device 103 to determine whether or not the authentication has succeeded.

If the authentication has succeeded, the process proceeds to step S411. In step S411, the agent application 107 returns the authentication information that has succeeded in authentication to the calling source. In contrast, if the authentication has failed (or communication with device 103 has failed), the process proceeds to step S405. For example, if the community name for reading of SNMPv1 in the device 103 is set to a value other than "banana", the agent application 107 results in failing to authenticate (communication).

If the authentication information has failed in acquisition ("NO" in S402), or if the authentication or the communication with the device 103 has failed ("NO" in S404), the process proceeds to step S405. In step S405, the agent application 107 requests the device management application 101 to acquire a list of the shared authentication information.

At this time, the agent application 107 specifies the authentication type and the authority (for example, "reading" of "SNMPv1"), and performs the above request. The authentication information management unit 113 of the device management application 101 refers to the shared authentication information (Table 1) and returns the authentication information corresponding to the request to the agent application 107. The details of this process will be described below with reference to FIG. 5.

As an example, in Table 1, a case is assumed in which the authentication information for reading/writing of SNMPv1 (community name) is requested. In this case, the device management application 101 returns "secret", "cabbage", and "carrot" to serve as the authentication information for reading/writing of SNMPv1 (community name) by the processes of S502 and S506 in FIG. 5 to be described below.

Additionally, in Table 1, a case is assumed in which the authentication information for reading of SNMPv1 is requested. In this case, the device management application 101 returns the list of the authentication information created by combining the authentication information for reading of SNMPv1 and the authentication information for reading/writing of SNMPv1 by the processes of steps S503 to S506 in FIG. 5 to be described below.

In step S406, the agent application 107 extracts the acquired authentication information from the list in order. In step S407, the agent application 107 determines whether or not the authentication information has been extracted successfully. If the extract of the authentication information has failed, the process proceeds to step S412, and the agent application 107 returns a notification that the authentication has failed to the calling source.

In contrast, if it is determined in step S407 that the authentication information has been extracted successfully, the process proceeds to step S408. In step S408, the agent application 107 performs communication for accessing the device 103 by using the acquired shared authentication information.

In step S409, the agent application 107 checks the result for accessing the device 103 and determines whether or not the authentication has succeeded. If the authentication has failed (or communication with device 103 has failed), the process returns to step S406. In this case, in the process of step S406, the agent application 107 acquires the next authentication information in the list.

In contrast, if it is determined in step S409 that the authentication has succeeded, the process proceeds to step S410. In step S410, the agent application 107 requests the device management application 101 to store the authentication information that has been authenticated successfully in association with the device 103, the authentication type, and the authority. The authentication information management unit 113 of the device management application 101 stores, in the authentication information for each device shown in Table 2, the authentication information that has been authenticated successfully in association with the device 103, the authentication type, and the authority.

Subsequently, the process proceeds to step S411, and the agent application 107 returns the authentication information that has been authenticated successfully to the calling source. Thus, the description of FIG. 4 is completed.

In the example of the present embodiment, the data in the second row in Table 2 indicates that the authentication information for reading/writing of SNMPv1 (community name) of the device 103 is "tomato". However, "tomato" is not included in the list of the shared authentication information for reading/writing of SNMPv1 shown in the second row in Table 1. For example, if the authentication processing of FIG. 4 is performed when "tomato" has been included in the shared authentication information in the past and "tomato" has been set as the authentication information for reading/writing of SNMPv1 of the device 103, the data in the second row of Table 2 is stored. Subsequently, when the user changes the authentication information shown in Table 1 by using the authentication information management screen described with reference to FIG. 3, "tomato" is deleted from the list of the shared authentication information. As described above, the above case can occur.

Figure 5:
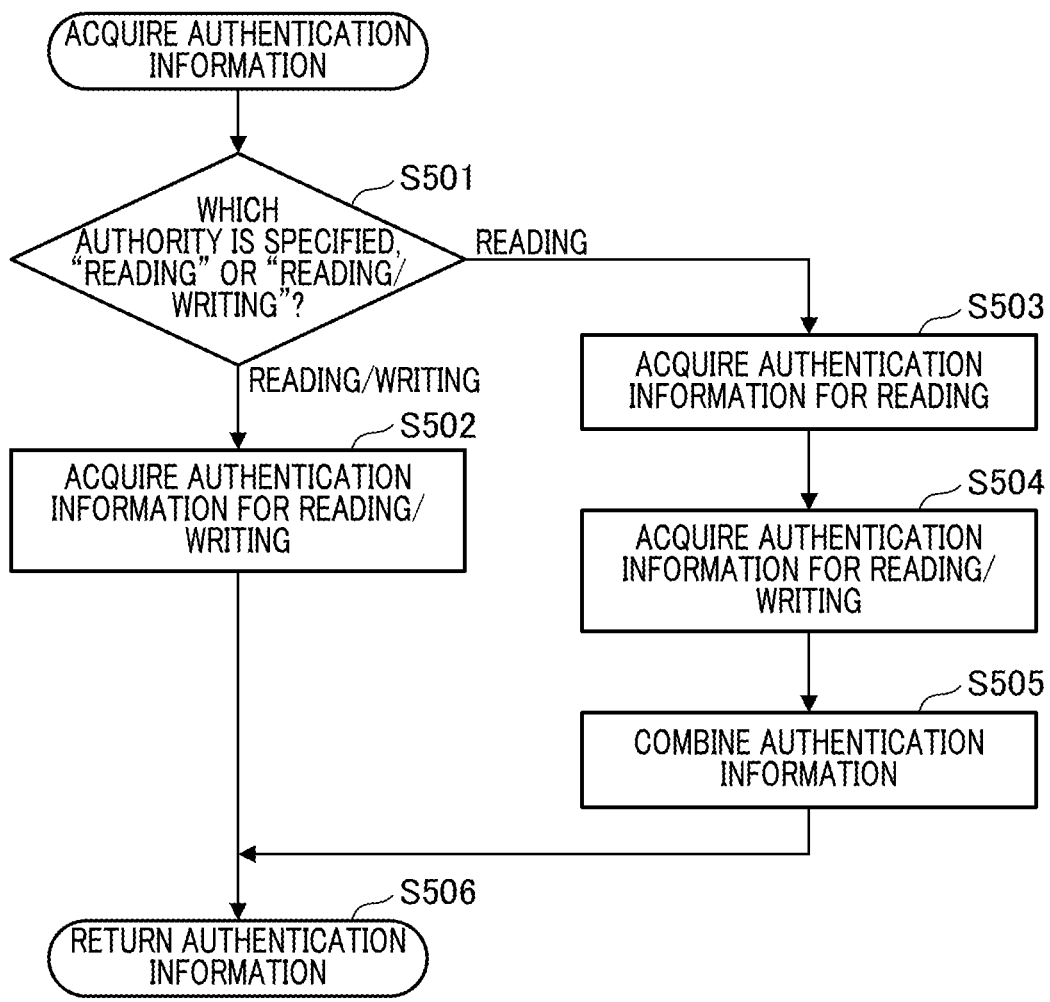
FIG. 5 is a flowchart illustrating a process of acquiring a list of the shared authentication information.

FIG. 5 is a flowchart illustrating the process in which the device management application 101 acquires the list of the shared authentication information invoked in step S405 of FIG. 4. Upon receipt of a request from the agent application 107, the device management application 101 specifies the authentication type and the authority (for example, "reading" of "SNMPv1"), and invokes the process of FIG. 5.

In step S501, the device management application 101 checks the access right (authority) of the specified authentication type. If the access right is "reading/writing", the process proceeds to step S502. In contrast, if the access right is "reading", the process proceeds to step S503.

In step S502, if the access right is "reading/writing", the device management application 101 acquires the list of the authentication information for "reading/writing" of the specified authentication, from among the shared authentication information shown in Table 1. Subsequently, the process proceeds to step S506.

For example, it is assumed that "reading/writing" of "SNMPv1" has been specified as the authentication type if the acquisition of the shared authentication information is requested in step S405 of FIG. 4. In this case, the list of the authentication information acquired by the device management application 101 based on Table 1 through the process in step S502 is as follows.
[Secret, Cabbage, Carrot]

In this way, if the shared authentication information for reading/writing of SNMP is requested, the device management application 101 does not combine the lists as in the case of reading, which will be described below (S505).

In step S503, if the access right is "reading", the device management application 101 acquires the list of the authentication information for "reading" of the specified authentication from among the shared authentication information shown in Table 1.

Subsequently, in step S504, the device management application 101 acquires the list of the authentication information for "reading/writing" of the specified authentication from among the shared authentication information shown in Table 1.

In step S505, the device management application 101 creates a list that combines the list of the authentication information for "reading" (S503) and the list of the authentication information for "reading/writing" (S504). Subsequently, the process proceeds to step S506.

For example, it is assumed that "reading" of "SNMPv1" has been specified as the authentication type if the acquisition of the shared authentication information is requested in step S405 of FIG. 4. In this case, the list of the authentication information created by the device management application 101 based on Table 1 through the processes of steps S503 to S505 is as follows.
[Public, Banana, Orange, Secret, Cabbage, Carrot]

Note that it is also possible to acquire the information by using the SNMP by specifying the authentication information for "reading" or specifying the authentication information for "reading/writing". If the acquisition of the list of the authentication information for "reading" of SNMP has been requested, the device management application 101 creates a list that combines the list of the authentication information for "reading" and the list of authentication information for "reading/writing", as described above. This process is the same for both SNMPv1 and SNMPv3.

For example, in the data in the third row of Table 2, "carrot", which is one piece of the shared authentication information for "reading/writing", is set in the authentication information for reading of SNMPv1 of the device 104. This shows a state in which the authentication of the device 104 is performed based on the list that combines the authentication information for "reading" and that for "reading/writing", and the authentication information that has succeeded in authentication is stored in Table 2 in association with the device 104 and the authentication type.

Note that the reason why the authentication information for "reading" of SNMPv3 of the device 105 in the fifth row of Table 2 matches the shared authentication information for "reading/writing" of SNMPv3 in the fourth row of Table 1 is also the same as the description above.

In step S506, the device management application 101 returns the list of the authentication information acquired in step S502 or the list of the authentication information combined in step S505 to the calling source. Thus, the description of FIG. 5 is completed.

Here, an example of the process of FIG. 4 will be described on the assumption that authentication information used for communication between the management device 102 and the device 103 has not been determined in communication that requires authentication with the device 103 by the management device 102. In this case, since the stored authentication information does not exist, the agent application 107 fails to acquire the authentication information from the device management application 101 ("NO" in S402).

The agent application 107 acquires the list of the shared authentication information that has been managed from the device management application 101 (S405). Subsequently, the agent application 107 extracts the acquired authentication information from the list one piece at a time in order, and attempts the authentication processing with the device 103 (the loop from S406 to S409). If this authentication process has succeeded, the device management application 101 stores the authentication information that has succeeded in authentication in association with the device 103 in response to a request from the agent application 107 (S410).

Subsequently, if the management device 102 performs communication that requires authentication again with the device 103, the agent application 107 is successful in acquisition of the authentication information because the authentication information stored in the previous communication exists ("YES" in S402). Additionally, the agent application 107 performs communication for accessing the device 103 by using the acquired authentication information (S403). In this case, an attempt of the authentication processing through the loop from steps S406 to S409 is not performed. However, if the authentication or the communication using the acquired authentication information has failed ("NO" in S404), the agent application 107 acquires the list of the shared authentication information and attempts the authentication processing again with the device 103 (S405 to S409).

Additionally, in the present embodiment, although the authentication information managed by the management device 102 in Table 2 is associated with the identification information (device ID) of the network device, no task related to the network device is specified. Therefore, the authentication information managed by the management device 102 in Table 2 can be shared and used in a plurality of tasks if the device ID, the authentication type, and the authority match. For example, when communication with the device 103 is performed by using a predetermined protocol upon execution of the first task, the agent application 107 can use the authentication information of the predetermined protocol of the device 103 stored by the authentication upon execution of the second task.

Examples of sharing the authentication information among a plurality of tasks include the following examples. For example, a shared SNMP is used for communication of a task that acquires device configuration information and a task that searches a device. Hence, with regard to the task that acquires the device configuration information and the task that searches a device, the authentication information can be shared among these tasks if the device ID, the authentication type, and the authority match. Similarly, for example, also regarding a task that distributes an address book and a task that distributes device setting information, the authentication information can be shared between these tasks if the device ID, the authentication type, and the authority match.

Second Embodiment

Next, the second embodiment will be described. Note that since the overall configuration of the management system of the network device and the application of the management device in the second embodiment are the same as those in the first embodiment, the redundant description thereof will be omitted.

There are cases in which the authentication processing inside the device changes depending on the device settings. For example, it is possible to perform the settings so as to authenticate the device in conjunction with an authentication system on the network, and is possible to perform the settings so as to authenticate the device based on the authentication information stored inside the device. For example, there exist an authentication system on a network that performs authentication by using a user name and a password, and an authentication system on a network that performs authentication by using a domain name, a user name, and a password. In a function call by the WEB service, in many cases, access control using an authentication ticket is performed by using techniques such as SAML (Security Assertion Markup Language) in order to absorb the difference between the authentication processing thereof.

Figure 6:
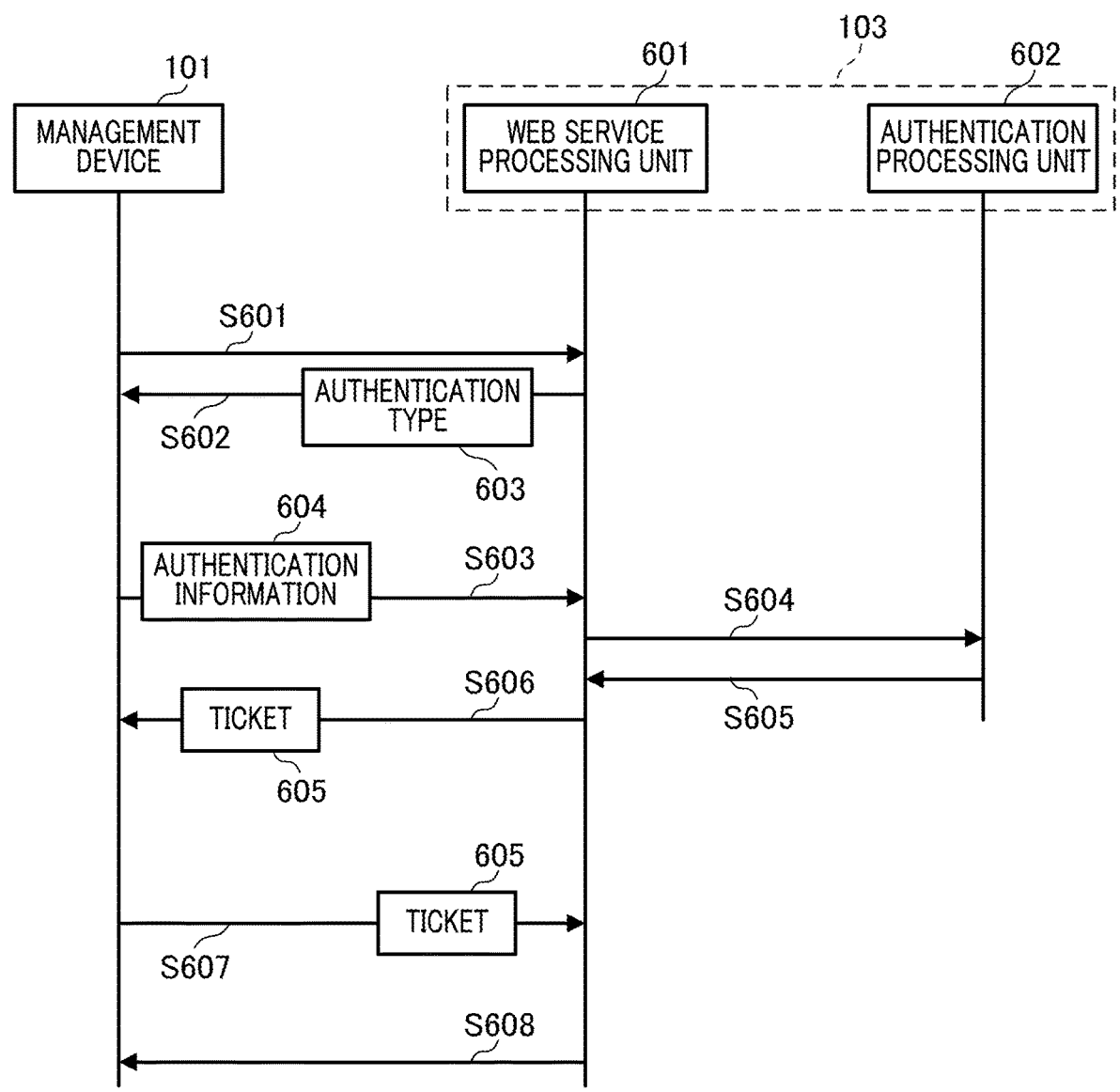
FIG. 6 is a flowchart illustrating a process in the connection to a device by using a WEB service.

Accordingly, in the second embodiment, an example of the authentication of the device by using the WEB service will be described. FIG. 6 is a flowchart that illustrates a process when the agent application 107 performs a connection to the device 103 by using the WEB service. Here, as shown in FIG. 6, the device 103 according to the second embodiment includes a WEB service processing unit 601 and an authentication processing unit 602. Note that another network device to be managed in the second embodiment has the WEB service processing unit 601 and an authentication processing unit 602 as necessary, in a manner similar the device 103.

First, in step S601, the agent application 107 of the management device 102 requests the device 103 to provide the list of the authentication type that is being currently supported by the device. In step S602, the WEB service processing unit 601 of the device 103 that has received this request returns a list 603 of the authentication type that is being currently supporting to the management device 102.

In step S603, the agent application 107 transmits an authentication request including authentication information 604 to the device 103. The authentication type of the authentication information 604 transmitted in step S603 is supported by the list 603 of the authentication type that has been returned from the device 103.

In step S604, the WEB service processing unit 601 of the device 103 that has received the authentication request requests, in the device 103, the authentication processing unit 602 corresponding to the specified authentication type to verify the authentication information 604. In step S605, the authentication processing unit 602 verifies the authentication information received from the WEB service processing unit 601, and returns the verification result to the WEB service processing unit 601.

The WEB service processing unit 601 generates an authentication ticket 605 if the verification result of the authentication information has succeeded. Then, in step S606, the WEB service processing unit 601 returns the generated authentication ticket 605 to the agent application 107, which is the calling source. Note that if the authentication has failed, the WEB service processing unit 601 returns a response indicating that the authentication has failed to the agent application 107 (this situation is not illustrated in the flowchart).

In step S607, the agent application 107 transmits a request to the device 103 also including the authentication ticket 605. The request transmitted in step S607 is, for example, a request for acquiring information from the device 103 or a request for changing a setting value of the device 103.

Upon receiving the request in step 607, the WEB service processing unit 601 extracts the authentication ticket 605 from the request, and verifies it. If the verification of the authentication ticket 605 has succeeded, the WEB service processing unit 601 executes a process requested from the agent application 107. In step S608, the WEB service processing unit 601 returns the processing result corresponding to the request to the agent application 107. If the verification of the authentication ticket 605 has failed, the WEB service processing unit 601 returns a notification indicating that the authentication has failed to the agent application 107. Thus, the description of FIG. 6 is completed.

In the second embodiment, the contents of the authentication information differ depending on the authentication type. Examples of the authentication information include a personal identification number consisting of only numeric values, a password character string, the combination of a user name and a password, and the combination of a domain name, a user name, and a password.

Table 3 shows an example of the combination of the authentication type and the authentication information in the second embodiment. For example, for the authentication type "ADMIN", an administrator password is required for accessing the device 103 as an administrator. For the authentication type "SSO", the network device requests an external system to perform authentication by a user name and a password. For the authentication type "LDAP", the network device cooperates with the LDAP server and performs authentication.

TABLE 3

| Authentication Type | Authentication Information |
| --- | --- |
| PIN | Personal identification number |
| ADMIN | Password |
| LOCAL | User/password |
| SSO | User/password |
| LDAP | Domain/user/password |
| NTLM | Domain/user/password |

Additionally, FIG. 7A illustrates a display example of the shared authentication information management screen in the second embodiment. Here, the processes related to each screen shown in FIG. 7A and FIG. 7B are all executed by the authentication information management unit 113 of the device management application 101.

The shared authentication information management screen shown in FIG. 7A corresponds to the shared authentication information management screen shown in FIG. 3A.

Accordingly, in FIG. 7A, components that are shared to those in FIG. 3A are denoted by the same reference numerals, and redundant description thereof will be omitted. In FIG. 7A, as the shared authentication information listed in table 304, a case in which the authentication types are "PIN", "Password", and "User authentication (the combination of a username and a password)" are added. Additionally, the authentication type selection drop-down 301 in FIG. 7A shows that "Domain Authentication (the combination of a domain name, a username, and a password)" can be selected.

Additionally, FIG. 7B illustrates a display example of an editing screen that edits the shared authentication information for reading/writing of domain authentication, which is displayed by the operation of FIG. 7A. As shown in FIG. 7B, the editing screen includes an add button 701, a table 702, a storage button 704, and a cancel button 705.

The table 702 shows a list of the authentication information to be set. When a specifying operation of an icon 703 denoted by the symbol "V" at the right end of the table 702 by a user has been detected, the device management application 101 deletes the corresponding row from the table 702. When the pressing of the add button 701 has been detected, the device management application 101 adds a row at the end of the table 702.

When the pressing of the storage button 704 has been detected, the device management application 101 stores the contents of the table 702 set by the user in the shared authentication information in association with the authentication type (domain authentication) and the authority. Subsequently, the device management application 101 closes the editing screen of FIG. 7B and returns to the setting screen of the shared authentication information in FIG. 7A. Additionally, when the pressing of the cancel button 705 has been detected, the device management application 101 discards the edited contents, closes the editing screen of FIG. 7B, and returns to the setting screen of the shared authentication information in FIG. 7A. Note that other than the items in the table 702 being changed, the editing screen related to "PIN", "Password", and "User Authentication" is the same as that in FIG. 7B, and the descriptions thereof will be omitted.

Table 4 schematically shows an example of the shared authentication information that has been managed according to the second embodiment. In Table 4, authentication information data related to "PIN", "Password", "User", "Domain", which are new authentication types, are added to serve as the authentication information, at least one piece of which is registered for each authentication type. The descriptions other than this will be omitted because they are the same as those in Table 1.

TABLE 4

| Authentication Type | Authority | Authentication Information |
| --- | --- | --- |
| SNMPv1 | R | ["public", "banana", "orange"] |
| SNMPv1 | RW | ["secret", "cabbage", "carrot"] |
| SNMPv3 | R | [{"name":"admin", "authK":"apple", "authP":"sha1", "encK":"grape", "encP":"aes", "context":""}, ["name":"manager", "authK":"mango", "authP":"sha1", "encK":"melon", "encP":"aes", "context":"grade"}] |
| SNMPv3 | RW | [{"name":"admin", "authK":"cabbage", "authP":"sha1", "encK":"carrot", "encP":"aes", "context":"veget"}] |

TABLE 4-continued

| Authentication Type | Authority | Authentication Information |
|---|---|---|
| PIN | RW | ["7654321", "1234567", "9989781"] |
| Password | RW | ["pa55w0rd", "open sesame"] |
| User | RW | [{"name":"admin", "pass":"53cr3txx."}, {"name":"root", "pass":"zhiheng"}] |
| Domain | RW | [{"domain":"mycomp", "user":"printer", "pass":"kuruming"}, {"domain":"mycomp", "user":"mfp", "pass":"shimasan"}] |

Table 5 schematically illustrates an example of the authentication information associated with the network device in the second embodiment. In Table 5, "Web Service", which does not exist in the authentication type of the shared authentication information in Table 4, is set. In the authentication information of "Web Service" in Table 5, the authentication information of the shared authentication setting in Table 4 is stored as the authentication type.

TABLE 5

| Device ID | Authentication Type | Authority | Authentication Information |
|---|---|---|---|
| 4037e754 | SNMPv1 | R | "banana" |
| 4037e754 | SNMPv1 | RW | "tomato" |
| 4037e754 | Web Service | RW | ["type":"LOCAL", "auth":{"name":"admin", "pass":"53cr3txx."}] |
| 8ff73899 | SNMPv1 | R | "carrot" |
| 8ff73899 | SNMPv1 | RW | "carrot" |
| 8ff73899 | Web Service | RW | {"type":"LOCAL", "auth":{"name":"admin", "pass":"53cr3txx."}} |
| d04973eb | SNMPv3 | R | [{"name":"admm", "authK":"cabbage", "authP":"sha1", "encK":"carrot", "encP":"aes", "context":"veget"}] |
| d04973eb | SNMPv3 | RW | [{"name":"admin", "authK":"cabbage", "authP":"sha1", "encK":"carrot", "encP":"aes", "context":"veget"}] |
| d04973eb | Web Service | RW | {"type":"LDAP", "auth":{"domain":"mycomp", "user":"mfp", "pass":"shimasan"}} |

FIG. 8 is a flowchart illustrating a process of confirming the authentication information when the agent application 107 communicates with the device 103 by using a predetermined authentication type that requires authentication in the second embodiment.

In step S801, the agent application 107 acquires the list of the authentication types of the WEB service that are currently being supported by the device 103 from the device 103. This processing is realized by steps S601 and S602 in FIG. 6. For example, the list returned from device 103 is as follows:
["LDAP", "NTLM"]

In step S802, the agent application 107 requests the device management application 101 to acquire the authentication information associated with the device 103.

At this time, the agent application 107 specifies the device ID, the authentication type, and the authority (for example, "reading/writing" of "WEB service") of the device 103, and performs the above request. The authentication information management unit 113 of the device management application 101 refers to the authentication information (Table 5) associated with the network device and returns the authentication information corresponding to the request to the agent application 107. Note that if the authentication information corresponding to the request does not exist in the table 5, the authentication information management unit 113 returns a notification indicating that there is no authentication information.

For example, in the case of reading/writing of the WEB service to the device 103, the agent application 107 acquires the following authentication information: {"type": "LOCAL", "auth": {"name": "admin", "pass": "53cr3txx."}}

In step S803, the agent application 107 checks the acquisition result of the authentication information to determine whether or not the authentication information has been acquired successfully. If the authentication information has been acquired successfully, the process proceeds to step S804, and if the authentication information has not been acquired, the process proceeds to step S807.

In step S804, the agent application 107 determines whether or not the authentication type (in the above example, "LOCAL") acquired from the device management application 101 is included in the list of the authentication type acquired from the device 103. If the authentication type acquired in step S802 matches any of the types in the list of the authentication types in step S803, the process proceeds to step S805. If the authentication type acquired in step S802 does not match any of the types in the list of authentication types in step S803, the process proceeds to step S807.

If the acquired authentication type matches any of the types in the list of authentication types, in step S805, the agent application 107 performs communication for accessing the device 103 by using the acquired authentication information. This communication corresponds to step S603 in FIG. 6. Subsequently, in step S806, the agent application 107 checks the result for accessing the device 103, and determines whether or not the authentication has succeeded.

If the authentication has succeeded, the process proceeds to step S813. In step S813, the agent application 107 returns the authentication ticket (605) that has been acquired from the device 103 to the calling source. In contrast, if the authentication has failed (or communication with the device 103 has failed), the process proceeds to step S807.

If the acquisition of the authentication information has failed ("NO" in S803), if the acquired authentication type does not match the list of the authentication type ("NO" in S804), or if the authentication or communication with the device 103 has failed ("NO" in S806), the process proceeds to step S807. In step S807, the agent application 107 requests the device management application 101 to acquire the list of the shared authentication information.

At this time, the agent application 107 specifies the authentication type and performs the request. The authentication information management unit 113 of the device management application 101 refers to the shared authentication information (Table 4) and returns the authentication information corresponding to the request to the agent application 107. The details of this process will be described below with reference to FIG. 9.

In step S808, the agent application 107 extracts the authentication information that matches the authentication type supported by the device 103 in order from the list of the shared authentication information that has been acquired from the device management application 101. In the above example, among the list of the shared authentication information that has been acquired from the device management application 101, the authentication information having the authentication type "LDAP" or "NTLM" is extracted in order.

In step S809, the agent application 107 determines whether or not the authentication information has been successfully extracted. If the extract of the authentication information has failed, the process proceeds to step S814, and the agent application 107 returns a notification indicating that the authentication has failed to the calling source.

In contrast, if it is determined in step S809 that the authentication information has successfully been extracted, the process proceeds to step S810. In step S810, the agent application 107 performs communication for accessing the device 103 by using the shared authentication information that has been acquired. This communication corresponds to step S603 of FIG. 6.

In step S811, the agent application 107 checks the result for accessing the device 103 and determines whether or not the authentication has succeeded. If the authentication has failed (or communication with device 103 has failed), the process returns to step S808. In this case, in the process of step S808, the agent application 107 acquires the next authentication information in the list.

In contrast, if it is determined in step S811 that the authentication has succeeded, the process proceeds to step S812. In step 812, the agent application 107 requests the device management application 101 to store the authentication information that has been successfully authenticated in association with the device 103 and the authentication type. The authentication information management unit 113 of the device management application 101 stores the authentication information that has been successfully authenticated in the authentication information of each device shown in Table 5, in association with the device 103, the authentication type, and the authority.

Subsequently, the process proceeds to step S813, and the agent application 107 returns the authentication ticket (605 in FIG. 6) acquired from the device 103 to the calling source. This communication corresponds to step S607 of FIG. 6. Thereby, the description of FIG. 8 is completed.

Figure 9:
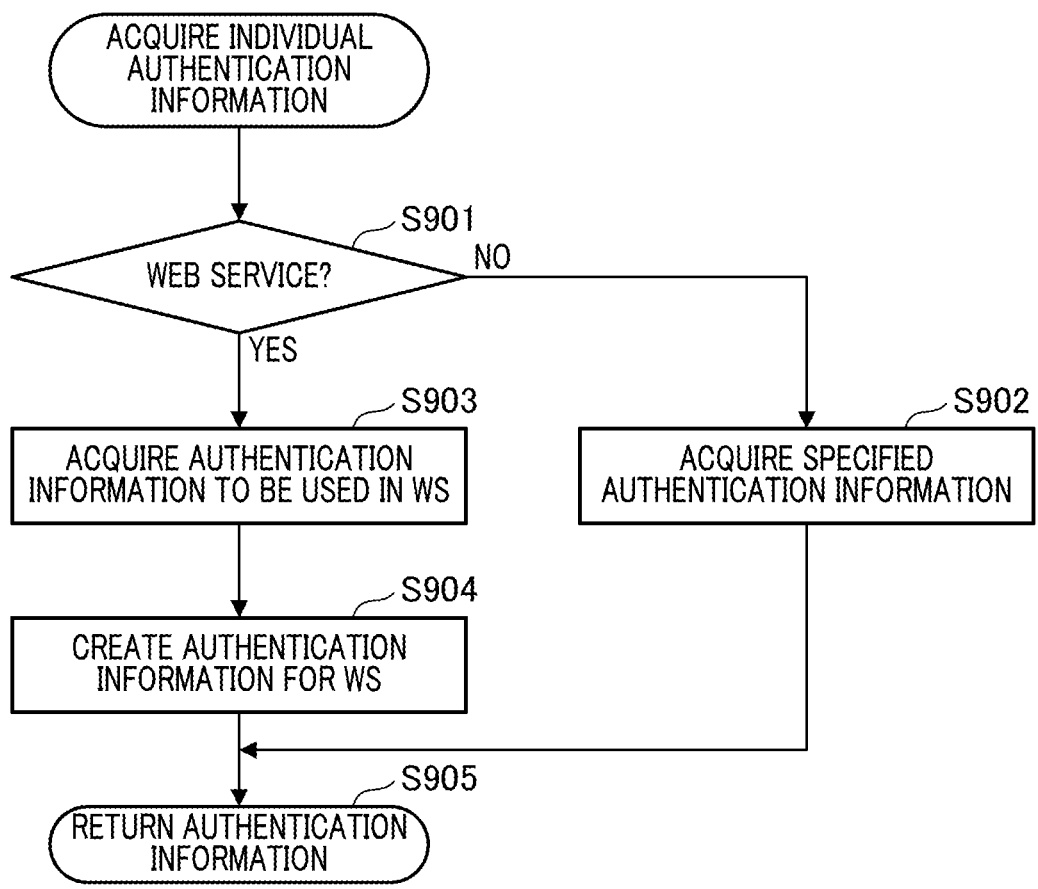
FIG. 9 is a flowchart illustrating a process of acquiring a list of the shared authentication information.

FIG. 9 is a flowchart that illustrates a process in which the device management application 101 acquires the list of the shared authentication information invoked in step S807 of FIG. 8. Upon receipt of a request from the agent application 107, the device management application 101 specifies the authentication type and the authority, and invokes the process of FIG. 9.

In step S901, the device management application 101 determines whether or not the specified authentication type is the WEB service. If the authentication type is the WEB service, the process proceeds to step S903. In contrast, if the authentication type is not the WEB service, the process proceeds to step S902.

If the specified authentication type is not the WEB service, in step S902, the device management application 101 acquires the information about the specified authentication type and the access right from the shared authentication information in Table 4. Subsequently, the process proceeds to step S905.

In contrast, if the specified authentication type is the WEB service, in step S903, the device management application 101 acquires the authentication information to be used in the WEB service from the shared authentication information in Table 4. Here, the authentication information to be used in the WEB service is, for example, each piece of the information of the authentication type, "PIN", "Password", "User", and "Domain" among the shared authentication information.

Next, in step S904, the device management application 101 creates authentication information for the WEB service from the authentication information that has been acquired in step S903. Subsequently, the process proceeds to step S905. The authentication information created in step S904 is obtained by combining the authentication information having the authentication type, "PIN", "Password", "User", and "Domain". As an example, an example of the authentication information for the WEB service that has been created from Table 4 is shown below.

TABLE 6

[
    {"type":"PIN", "auth":"7654321"},
    {"type":"PIN", "auth":"1234567"},
    {"type":"PIN", "auth":"9989781"},
    {"type":"ADMIN", "auth":"pa55w0rd":},
    {"type":"ADMIN", "auth":"open sesame":},
    {"type":"LOCAL", "auth":{"name":"admin", "pass":"53cr3txx."}},
    {"type":"LOCAL", "auth":{"name":"root", "pass":"zhiheng"}},
    {"type":"SSO", "auth":{"name":"admin", "pass":"53cr3txx."}},
    {"type":"SSO", "auth":{"name":"root", "pass":"zhiheng"}},
    {"type":"LDAP", "auth":{"domain":"mycomp", "user":"printer", "pass":"kuruming"}},
    {"type":"LDAP", "auth":{"domain":"mycomp", "user":"mfp", "pass":"shimasan"}},
    {"type":"NTLM", "auth":{"domain":"mycomp", "user":"printer", "pass":"kuruming"}},
    {"type":"NTLM", "auth":{"domain":"mycomp", "user":"mfp", "pass":"shimasan"}}
]

In step S905, the device management application 101 returns the list of the authentication information acquired in step S902 or the list of the authentication information created in step S904 to the calling source. Thus, the description of FIG. 9 is completed.

Third Embodiment

Figure 10:
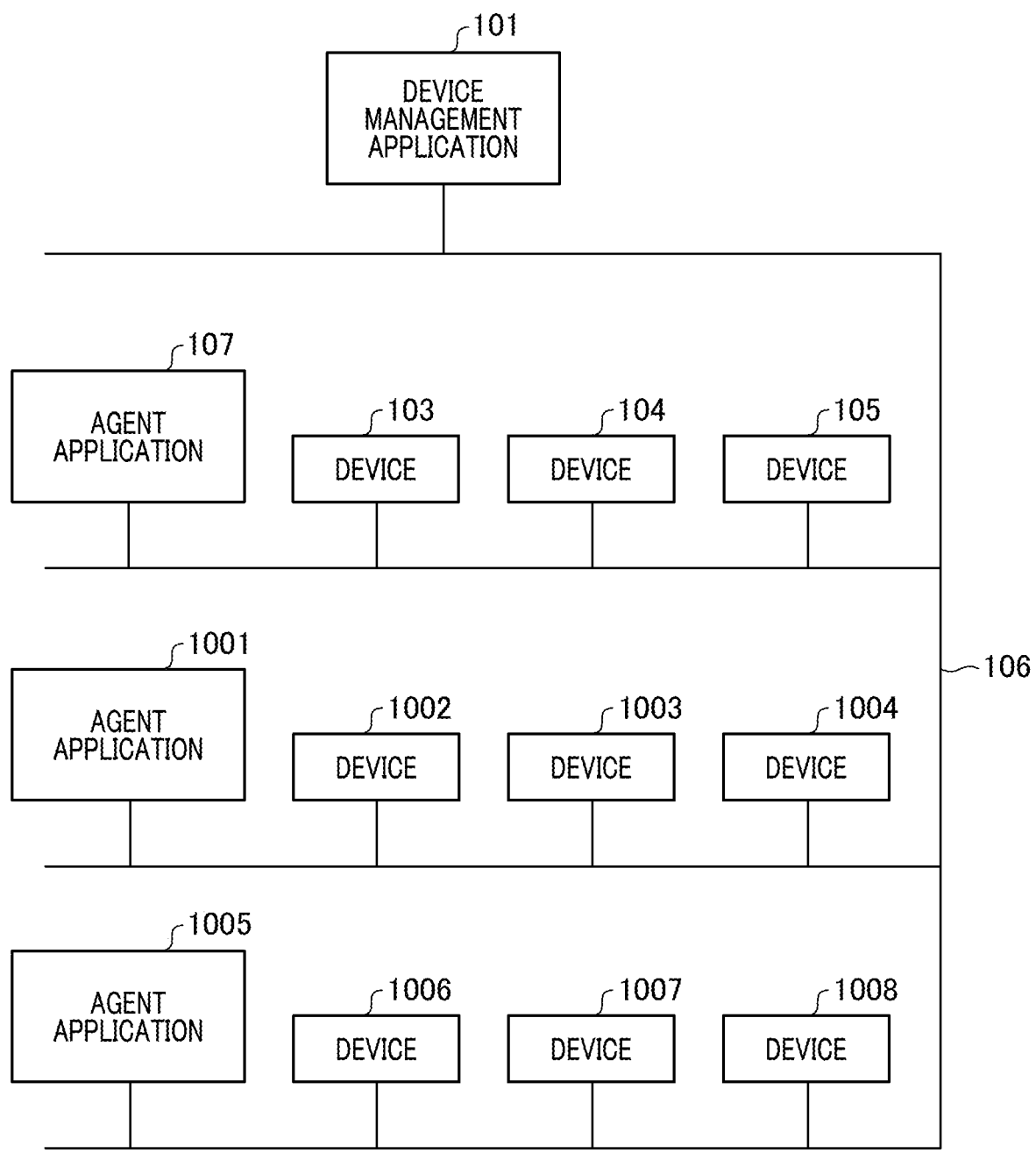
FIG. 10 is a block diagram illustrating the overall configuration of the management system of the network device and components of each application according to the third embodiment.

Next, the third embodiment will be described. FIG. 10 illustrates an example of the overall configuration of the device management system according to the present embodiment. In the following description, the same reference numerals are used for the same components as those in the first embodiment and the second embodiment, and redundant description will be omitted.

In the present embodiment, the device management system is configured by one device management application 101 and a plurality of agent applications 107, 1001, and 1005. Here, the device management application 101 and the agent applications 1001 and 1005 operate on different devices. In contrast, the agent application 107 may be operated by the management device 102 in which the device management application 101 operates, or may be operated by another device.

The components of the software modules of the device management application 101 and the agent application 107 shown in FIG. 10 are the same as those in FIG. 1. Additionally, the components of the software modules of the agent applications 1001 and 1005 shown in FIG. 10 are the same as those of the software modules of the agent application 107 shown in FIG. 1.

The agent application 107 of the present embodiment communicates with the devices 103, 104, and 105 to execute various processes. Similarly, the agent application 1001 communicates with devices 1002, 1003, and 1004 to execute various processes. The agent application 1005 communicates with devices 1006, 1007, and 1008 to execute various processes.

The device management application 101 of the present embodiment assigns a device to each agent application in accordance with the address of the device and the name on the network. The device management application 101 assigns, for example, a device having an IP address in the range of 192.168.0.0 to 192.168.9.255. to the agent application 107. Additionally, the device management application 101 assigns, for example, a device having an IP address in the range of 192.168. 10.0 to 192.168.19.255 to the agent application 1001.

It is assumed that an appropriate IP address is assigned to each device of the present embodiment in accordance with the location where the device is installed. For example, a device having an IP address in the range of 192.168. 0.0 to 192.168. 9.255 is installed in the Tokyo office, and a device having an IP address in the range of 192.168.10.0 to 192.168.19.255 is installed in the London office. Specifically, the device in the Tokyo office is assigned to the agent application 107, and the device in the London office is assigned to the agent application 1001.

Table 7 shows the correspondence between the agent application and the IP address of the device assigned to the agent application. Here, the agent ID is an identifier (a character string) generated by the device management application 101 for uniquely identifying each agent application. The agent name is a character string set by the user in order for the user to identify each agent application. The example of Table 7 shows that the agent names of the agent applications 107, 1001, and 1005 are respectively "Tokyo", "London", and "Chicago".

TABLE 7

| Agent ID | Agent Name | Address of device to be Assigned |
|---|---|---|
| 64d968ecc9cc | Tokyo | 192.168.0.0-192.168.9.255 |
| 1a1b7bce6bb0 | London | 192.168.10.0-192.168.19.255 |
| dd859a155274 | Chicago | 192.168.20.0-192.168.24.255, 192.168.30.0-192.168.39.255 |

Table 8 schematically illustrates an example of the shared authentication information managed by the device management application 101. In Table 8, the agent application to which each authentication information is applied is shown in the column of "Agent ID". Here, the symbol "*" means that the authentication information is used for all of the agent applications. The following items (1) to (4) are set in Table 8.

(1) The shared authentication information in which the authentication type is "SNMPv1", the access right is "for reading", and the community name is "public", is used in all the agent applications.

(2) The shared authentication information in which the authentication type is "SNMPv3", the access right is "reading/writing", the user name is "admin", and the authentication key is "cabbage", is used in all the agent applications.

(3) The shared authentication information in which the authentication type is "SNMPv3", the access right is "reading/writing", the user name is "manager", and the authentication key is "apple", is used in the agent application having the agent ID "64d968ecc9cc". Note that the agent ID "64d968ecc9cc" is an agent application having the agent name "Tokyo".

(4) The shared authentication information in which the authentication type is "SNMPv3", the access right is "reading/writing", the user name is "manager", and the authentication key is "banana", is used in the agent application having the agent ID "1a1b7bce6bb0" or "dd858a155274". Note that the agent IDs "1a1b7bce6bb0" and "dd858a155274" are agent applications having agent names "London" and "Chicago"

TABLE 8

| Authentication Type | Authority | Authentication Information | Agent ID |
|---|---|---|---|
| SNMPv1 | R | ["public"] | * |
| SNMPv3 | RW | [{"name":"admin", "authK":"cabbage", "authP":"sha1", "encK":"carrot", "encP":"aes", "context":"veget"}] | * |
| SNMPv3 | RW | [{"name":"manager", "authK":"apple", "authP":"sha1", "encK":"grape", "encP":"aes", "context":"fruit"}] | 64d968ecc9cc |

TABLE 8-continued

| Authentication Type | Authority | Authentication Information | Agent ID |
|---|---|---|---|
| SNMPv3 | RW | [{"name":"manager", "authK":"banana", "authP":"sha1", "encK":"mango", "encP":"aes", "context":"fruit"}] | 1a1b7bce6bb0, dd859a155274 |

FIG. 11A and FIG. 11B each illustrate an display example of the shared authentication information management screen in the present embodiment. Here, the processing related to each screen shown in FIG. 11A and FIG. 11B is all executed by the authentication information management unit 113 of the device management application 101. FIG. 11A and FIG. 11B are display examples of the screens according to the present embodiment, which correspond to the screens of FIG. 3A and FIG. 3C in the first embodiment. Accordingly, here, a description will be given about matter that differs from FIG. 3A and FIG. 3C.

As shown in FIG. 11A, the authentication information management screen includes the table 304 in which the shared authentication information that is currently being set is listed. In the table 304 of FIG. 11A, a column 1101 corresponding to "Agent" indicates the agent name of the agent application that uses each of the shared authentication information. In the display of the column 1101 of FIG. 11A, if the authentication type is used in all of the agent applications, a character string indicating that the authentication type is used in all of the agent applications may be displayed instead of displaying all of the agent names.

FIG. 11B illustrates a display example of the editing screen that edits the shared authentication information for reading/writing of SNMPv3. In the editing screen shown in FIG. 11B, items (1102 to 1108) for setting an agent application that uses the authentication information is added in comparison with the screen shown in FIG. 3C. Here, the above items 1102 to 1108 are displayed on the screen regardless of type of the authentication information to be edited.

Radio buttons 1102 and 1103 shown in FIG. 11B are used to set whether to use the authentication information in all agent applications or to individually specify an agent application that uses the authentication information. If the radio button 1102 ("use this authentication information in all agents") has been selected, use of the control 1104 that selects an agent in FIG. 11B is not allowed. In contrast, if the radio button 1103 ("use this authentication information in the selected agent") has been selected, use of the control 1104 for selecting the agent in FIG. 11B is allowed.

Additionally, the control 1104 shown in FIG. 11B includes check boxes 1105 to 1108. The check boxes 1106 to 1108 are check boxes for individually selecting each agent. The check box 1105 is a check box for performing all selections (or cancel all selections) of each agent in the control 1104.

Upon detection of the pressing of the storage button 312, the device management application 101 stores the authentication type information, the access right, the authentication information input by the user, and the setting of the agent application that uses the authentication information in the shared authentication information shown in Table 8. Subsequently, the device management application 101 closes the editing screen of FIG. 11B and returns the screen to the shared authentication information setting screen of FIG. 11A.

Figure 12:
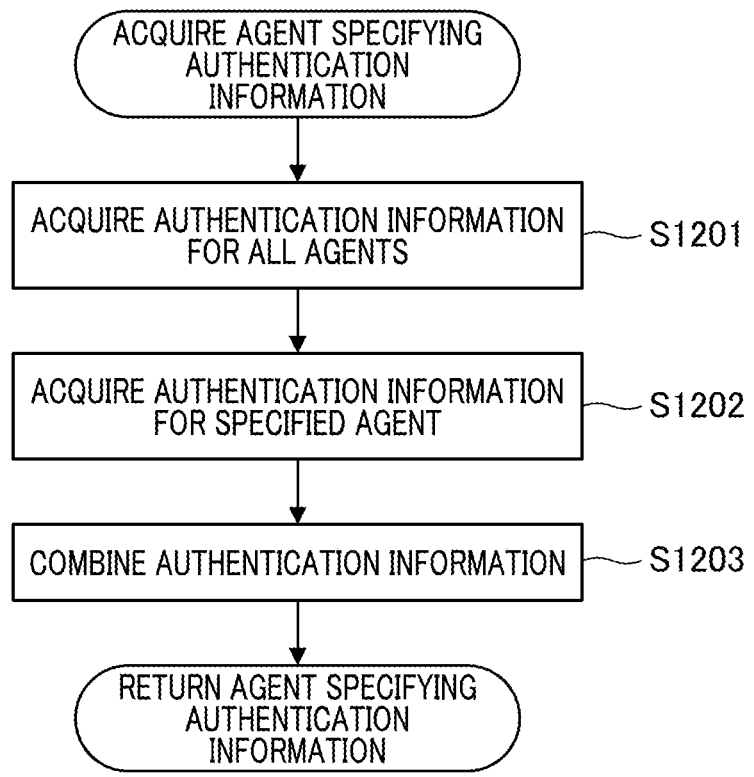
FIG. 12 is a flowchart illustrating a process of specifying an agent and acquiring the shared authentication information.

FIG. 12 is a flowchart illustrating details of the acquisition processing of the authentication information in steps S502, S503, and S504 of the acquisition processing of authentication information shown in FIG. 5. The processing for acquiring the agent specification authentication information shown in FIG. 12 is invoked together with the agent ID that uniquely identifies the agent application, the authentication type, and the access right. In each of the above steps of FIG. 5, the process of FIG. 12 is invoked by using its agent ID.

In step S1201, in the processing of acquiring the agent specifying authentication information, (a plurality of pieces of) information that can be used in all the agent applications from among the shared authentication information having the specified authentication type and access right.

In step S1202, the process of acquiring the agent specifying authentication information acquires the information that can be used in the agent application shown by the specified agent ID from among the shared authentication information having the specified authentication type and access right.

In step S1203, in the processing of acquiring the agent specifying authentication information, the shared authentication information acquired in steps S1201 and S1202 is combined and the combined information is returned to the calling source. Subsequently, the processes after step S506 in FIG. 5 are executed.

For example, in the settings of Table 8, the case is considered in which the process of FIG. 12 is invoked by specifying the authentication type "SNMPv3", the access right "read/write", and the agent ID "1a1b7bce6bb0". In this case, the shared authentication information in the second and fourth rows of Table 8 is returned to the calling source.

Application Example

In FIG. 12, although the authentication information that can be used in all the agent applications is acquired in step S1201, in FIG. 12, the process in step S1202 may be executed in advance. Further, if the authentication information corresponding to the specified agent ID can be acquired in the process of step S1202 that has been executed in advance, the process of step S1201 may be skipped. By this application example, during authentication, it is possible to attempt only the combination of the authentication information that has been set for the agent ID in advance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-237783, filed Dec. 19, 2018 and Japanese Patent Application No. 2019-162745, filed Sep. 6, 2019, which is hereby incorporated by reference wherein in its entirety.

What is claimed is:

1. A management system comprising:
a management unit configured to manage at least shared authentication information for a plurality of protocols, at least one piece of the shared authentication information being registered for each protocol of the plurality of protocols, and, for a particular protocol of the plurality of protocols, at least two pieces of the shared authentication information are registered for the particular protocol;
a communication unit configured, in a state in which device-specific authentication information is not determined for a network device, to attempt authentication processing with the network device for communication with the network device according to the particular protocol of the plurality of protocols, the authentication processing attempted by using, in order, each of the at least two pieces of the shared authentication information registered for the particular protocol and
a storage unit configured, in a state in which the authentication processing is successful using a particular one of the at least two pieces of the shared authentication information registered for the particular protocol for the communication with the network device according to the particular protocol, to store, as updated device-specific authentication information, at least the particular one of the at least two pieces of the shared authentication information in association with the network device and the particular protocol,
wherein, if the updated device-specific authentication information has been stored in the state in which the authentication processing is successful, the communication unit is configured to perform subsequent communication with the network device using the stored updated device-specific authentication information without attempting the authentication processing.

2. The management system according to claim 1,
wherein the management unit and the storage unit are realized by a processing of a first application that manages the shared authentication information, and
wherein the communication unit is realized by a processing of a second application that is different from the first application.

3. The management system according to claim 2,
wherein the management unit is configured to manage at least the particular protocol and the shared authentication information in association with identification information of the second application, and
wherein, in the state in which the device-specific authentication information is not determined for the network device, the communication unit is configured to attempt the authentication processing with the network device for the communication with the network device according to the particular protocol of the plurality of protocols by using, in order, each of the at least two pieces of the shared authentication information managed in association with the identification information of the second application.

4. The management system according to claim 1,
wherein the particular one of the at least two pieces of the shared authentication information registered for the particular protocol is a second particular one of the at least two pieces of the shared authentication information registered for the particular protocol, and
wherein, in a state in which the authentication processing with the network device for the communication with the network device according to the particular protocol of the plurality of protocols by using a first particular one of the at least two pieces of the shared authentication information registered for the particular protocol has failed, the communication unit is configured to attempt the authentication processing with the network device for the communication with the network device according to the particular protocol of the plurality of protocols by using the second particular one of the at least two pieces of the shared authentication information registered for the particular protocol.

5. The management system according to claim 1,
wherein the storage unit is configured to store, for each protocol of the plurality of protocols, respective updated device-specific authentication information that has been authenticated successfully in association with the network device, and
wherein the communication unit is configured to use the respective updated device-specific authentication information corresponding to a predetermined protocol of the plurality of protocols stored in association with the network device if authentication is required for communication with the network device by using the predetermined protocol.

6. The management system according to claim 5,
wherein if authentication is required for communication with the network device by using the predetermined protocol in order to execute a first task, the communication unit is configured to share and use authentication information that has been used for authentication upon execution of a second task that is different from the first task and stored in association with the predetermined protocol and the network device.

7. The management system according to claim 1,
wherein the management unit is configured to manage, as at least part of the shared authentication information, information necessary for authentication, at least one piece of the information necessary for authentication being registered for each authentication type of a plurality of authentication types of a WEB service corresponding to the network device, and wherein, if authentication is required for communication with the network device by using the WEB service, the communication unit is configured to acquire at least a particular authentication type of the plurality of authentication types from the network device and attempt authentication with the network device by using the WEB service and the one piece of the information necessary for authentication registered for the particular authentication type.

8. The management system according to claim 7, wherein, in a state in which the authentication with the network device by using the WEB service and the one piece of the information necessary for authentication registered for the particular authentication type is successful, the storage unit is configured to store the one piece of the information necessary for authentication registered for the particular authentication type to serve as the authentication information for the WEB service in association with the network device, and wherein in a state in which the one piece of the information necessary for authentication registered for the particular authentication type has been stored to serve as authentication information for the WEB service in association with the network device, the communication unit is configured to perform subsequent communication with the network device by using the WEB service using the stored one piece of the information necessary for authentication registered for the particular authentication type without attempting use of others of the at least the one piece of the information necessary for authentication registered for the particular authentication type, in a state in which the at least the one piece of the information necessary for authentication registered for the particular authentication type includes at least two pieces of the information necessary for authentication registered for the particular authentication type.

9. The management system according to claim 8, wherein the one piece of the information necessary for authentication registered for the particular authentication type is a second piece of the information necessary for authentication registered for the particular authentication type, and wherein, in a state in which the authentication with the network device by using the WEB service and a first piece of the at least one piece of the information necessary for authentication registered for the particular authentication type has failed, the communication unit is configured to attempt the authentication with the network device by using the WEB service and the second piece of the information necessary for authentication registered for the particular authentication type.

10. A method in a management system for managing a network device, the method comprising:

managing at least shared authentication information for a plurality of protocols, at least one piece of the shared authentication information being registered for each protocol of the plurality of protocols, and, for a particular protocol of the plurality of protocols, at least two pieces of the shared authentication information are registered for the particular protocol;

attempting, in a state in which device-specific authentication information is not determined for the network device, authentication processing with the network device for communication with the network device according to the particular protocol of the plurality of protocols by using, in order, each of the at least two pieces of the shared authentication information registered for the particular protocol;

storing, as updated device-specific authentication information and in a state in which the authentication processing is successful using a particular one of the at least two pieces of the shared authentication information registered for the particular protocol for the communication with the network device according to the particular protocol, at least the particular one of the at least two pieces of the shared authentication information in association with the network device and the particular protocol; and performing, if the updated device-specific authentication information has been stored in the state in which the authentication processing is successful, subsequent communication with the network device using the stored updated device-specific authentication information without attempting the authentication processing.

* * * * *